(12) United States Patent
Mähling et al.

(10) Patent No.: US 8,119,752 B2
(45) Date of Patent: Feb. 21, 2012

(54) METHOD FOR PRODUCING ETHYLENE COPOLYMERS

(75) Inventors: Frank-Olaf Mähling, Mannheim (DE); Wolfgang Kasel, Nußloch (DE); Thomas Zelinski, Neuleiningen (DE)

(73) Assignee: BASF SE, Ludwigshafen (DE)

( * ) Notice: Subject to any disclaimer, the term of this patent is extended or adjusted under 35 U.S.C. 154(b) by 601 days.

(21) Appl. No.: 12/301,774

(22) PCT Filed: May 16, 2007

(86) PCT No.: PCT/EP2007/054730
§ 371 (c)(1),
(2), (4) Date: Nov. 21, 2008

(87) PCT Pub. No.: WO2007/135038
PCT Pub. Date: Nov. 29, 2007

(65) Prior Publication Data
US 2011/0136967 A1    Jun. 9, 2011

(30) Foreign Application Priority Data
May 23, 2006  (EP) .................................. 06114396

(51) Int. Cl.
*C08F 222/06*  (2006.01)
*C08F 222/10*  (2006.01)
*C08F 2/00*    (2006.01)

(52) U.S. Cl. .............. 526/272; 526/64; 526/65; 526/86; 526/318.25

(58) Field of Classification Search ............... 526/64, 526/65, 272, 318.25, 86
See application file for complete search history.

(56) References Cited

U.S. PATENT DOCUMENTS

| | | | | |
|---|---|---|---|---|
| 3,546,189 A | * | 12/1970 | Ratzsch et al. | 526/64 |
| 4,252,924 A | | 2/1981 | Chatterjee | |
| 4,910,046 A | | 3/1990 | Herwig et al. | |
| 4,937,303 A | | 6/1990 | Wolf et al. | |
| 5,298,577 A | | 3/1994 | Baade et al. | |
| 5,449,724 A | | 9/1995 | Moffat et al. | |
| 5,902,869 A | * | 5/1999 | Chou | 526/272 |
| 2002/0198323 A1 | * | 12/2002 | Morris | 525/192 |

FOREIGN PATENT DOCUMENTS

| | | |
|---|---|---|
| EP | 0 017 230 A1 | 10/1980 |
| EP | 0017230 A1 | 10/1980 |
| EP | 0315010 A2 | 5/1989 |
| EP | 0341499 A2 | 11/1989 |
| EP | 0374666 A2 | 6/1990 |
| EP | 0813550 B1 | 11/1999 |
| WO | WO2006/049783 A1 * | 5/2006 |
| WO | WO 2007/135031 A1 | 11/2007 |

OTHER PUBLICATIONS

*Ullman's Encyclopedia of Industrial Chemistry*, No. 5, vol. A 28, pp. 146-157.

* cited by examiner

*Primary Examiner* — Fred M Teskin
(74) *Attorney, Agent, or Firm* — Connolly Bove Lodge & Hutz LLP

(57) ABSTRACT

Process for the continuous preparation of ethylene copolymers by free-radical copolymerization of ethylene and at least one comonomer in a cascade comprising at least two reactors, wherein one or more initiators are fed into the reaction mixture downstream of the first reactor.

10 Claims, No Drawings

METHOD FOR PRODUCING ETHYLENE COPOLYMERS

RELATED APPLICATIONS

This application is a national stage application (under 35 U.S.C. §371) of PCT/EP2007/054730, filed May 16, 2007, which claims benefit of European application 06114396.2, filed May 23, 2006.

The present invention relates to a process for the continuous preparation of ethylene copolymers by free-radical copolymerization of ethylene and at least one comonomer in a cascade comprising at least two reactors, wherein one or more initiators are fed into the reaction mixture downstream of the first reactor.

Ethylene copolymers with one or more comonomers such as ethylenically unsaturated carboxylic acids and esters of ethylenically unsaturated carboxylic acids are preferably prepared continuously in the high-pressure process. The copolymerization is for this purpose carried out at pressures in the range from 500 to 5000 bar using one or more free-radical initiators (initiators). The reaction medium is ethylene which in the high-pressure process is generally present in the supercritical state. The copolymerization can also be carried out in the presence of one or more molar mass regulators (regulators). The products obtained are, depending on the mode of operation, ethylene copolymers having high molecular weights ($M_n$ abover 20 000 g/mol) or low molecular weights ($M_n$ not more than 20 000 g/mol) which can be employed for numerous products. An example which may be mentioned is the use as impact modifier.

However, in many cases it is found that the storage of ethylene copolymers is not unproblematical. Products having a low glass transition temperature, for example below $-40°$ C., frequently tend to conglutinate or cake at high exterior temperatures, for example in summer at 30° C. and more.

It is therefore an object of the invention to provide a process by means of which ethylene copolymers which do not tend to conglutinate or cake and are nevertheless suitable as impact modifier can be prepared.

We have accordingly found the process defined at the outset.

The continuous copolymerization of ethylene (a) and at least one comonomer can, according to the invention, be carried out in the form of a free-radically initiated copolymerization, preferably under high-pressure conditions, for example in continuously operated stirred high-pressure autoclaves, hereinafter also referred to as high-pressure autoclaves, or in high-pressure tube reactors, hereinafter also referred to as tube reactors.

The process of the invention is carried out in a cascade comprising at least two reactors. Suitable reactors are, for example, high-pressure autoclaves and high-pressure tube reactors; the latter will hereinafter also be referred to as tube reactors. The preparation in cascades comprising at least two high-pressure autoclaves, comprising at least two tube reactors or comprising a high-pressure autoclave and a tube reactor is preferred; particular preference is given to cascades comprising a high-pressure autoclave and a tube reactor.

Stirred high-pressure autoclaves are known per se and a description may be found in *Ullmann's Encyclopedia of Industrial Chemistry*, 5th edition, keywords: Waxes, Vol. A 28, p. 146 ff., Verlag Chemie Weinheim, Basel, Cambridge, N.Y., Tokyo, 1996. They preferably have a length/diameter ratio in the range from 5:1 to 30:1, more preferably from 10:1 to 20:1. The high-pressure tube reactors which can likewise be employed are likewise described in *Ullmann's Encyclopedia of Industrial Chemistry*, 5th edition, keywords: Waxes, Vol. A 28, p. 146 ff., Verlag Chemie Weinheim, Basel, Cambridge, N.Y., Tokyo, 1996.

In an embodiment of the present invention, the copolymerization is carried out at pressures in the range from 500 to 5000 bar, preferably from 1500 to 2500 bar. Conditions of this type will hereinafter also be referred to as high-pressure.

In an embodiment of the present invention, the copolymerization is carried out at reaction temperatures in the range from 120 to 300° C., preferably in the range from 170 to 280° C. Here, the reaction temperature does not have to be identical at all points in the apparatus used. Particularly when a tube reactor or a cascade is used, the reaction temperature can take on different values over the apparatus. In the latter case, the reaction temperature is, for the purposes of the present invention, the maximum temperature.

The comonomer or comonomers is/are selected from among vinylic compounds which can be copolymerized with ethylene. Examples are ethylenically unsaturated carboxylic acids, in particular ethylenically unsaturated monocarboxylic and dicarboxylic acids and derivatives such as esters of ethylenically unsaturated carboxylic acids, also α-olefins such as 1-hexene, 1-octene, 1-decene, 1-dodecene or 1-hexadecene and vinyl carboxylates or vinyl esters of carboxylic acids which do not have an ethylenic double bond, for example vinyl acetate and vinyl propionate. Further suitable comonomers are, for example, styrene, vinylsilanes, vinyiphosphonic acid and its monoalkyl and dialkyl esters, and isobutene.

In a preferred embodiment of the present invention, the comonomer or comonomers is/are selected from among ethylenically unsaturated carboxylic acids, ethylenically unsaturated dicarboxylic acids, esters of ethylenically unsaturated carboxylic acids and vinyl acetate.

In an embodiment of the present invention, the process of the invention is carried out by copolymerizing the following with one another:

(a) from 50 to 95% by weight, preferably from 55 to 82% by weight, particularly preferably from 75 to 80% by weight, of ethylene, (b) from 0.1 to 30% by weight, preferably from 1 to 15% by weight, particularly preferably up to 10% by weight, of at least one comonomer selected from among ethylenically unsaturated carboxylic acids and ethylenically unsaturated dicarboxylic acids, or (c) from 0.5 to 50% by weight, preferably from 20 to 40% by weight, of at least one comonomer selected from among esters of ethylenically unsaturated carboxylic acids, vinylphosphonic acid and their alkyl esters, (d) if appropriate, one or more further comonomers, for example up to 20% by weight, preferably up to 5% by weight.

Here, the percentages by weight are in each case based on the total ethylene copolymer prepared according to the invention.

The content of comonomer (b) can assume the value zero if at least 0.5% by weight of at least one comonomer specified under (c) is polymerized in. Conversely, the content of comonomer (c) can be zero if at least 0.1% by weight of at least one comonomer specified under (b) is polymerized in.

In an embodiment of the present invention, at least one monocarboxylic acid of the general formula I,

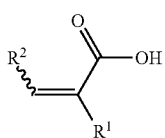

I where the variables are defined as follows:
$R^1$ and $R^2$ are identical or different,
$R^1$, is selected from among hydrogen and
  unbranched and branched $C_1$-$C_{10}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, isooctyl, 2-ethylhexyl, n-nonyl, n-decyl; particularly preferably $C_1$-$C_4$-alkyl such as methyl, ethyl, n-propyl, isopropyl, n-butyl, isobutyl, sec-butyl and tert-butyl, in particular methyl;
$R^2$ is selected from among unbranched and branched $C_1$-$C_{10}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, isooctyl, 2-ethylhexyl, n-nonyl, n-decyl; particularly preferably $C_1$-$C_4$-alkyl such as methyl, ethyl, n-propyl, isopropyl, n-butyl, isobutyl, sec-butyl and tert-butyl, in particular methyl;
and very particularly preferably hydrogen;
is selected as ethylenically unsaturated carboxylic acid.

In an embodiment of the present invention, $R^1$ is hydrogen or methyl. Very particular preference is given to $R^1$, being methyl.

In an embodiment of the present invention, $R^1$ is hydrogen or methyl and $R^2$ is hydrogen.

Acrylic acid or methacrylic acid is very particularly preferably used as ethylenically unsaturated carboxylic acid (b) of the general formula I.

If a plurality of ethylenically unsaturated carboxylic acids (b) are to be used, it is possible to use two different ethylenically unsaturated carboxylic acids of the general formula I, for example acrylic acid and methacrylic acid.

For the purposes of the present invention, ethylenically unsaturated dicarboxylic acids are preferably ethylenically unsaturated $C_4$-$C_{10}$-dicarboxylic acids, for example maleic acid, fumaric acid, citraconic acid, metaconic acid and itaconic acid, and also the corresponding anhydrides if they are in nonpolymeric form, for example itaconic anhydride and in particular maleic anhydride.

In a specific embodiment of the present invention, at least one ethylenically unsaturated monocarboxylic acid, for example a monocarboxylic acid of the general formula I, and at least one ethylenically unsaturated $C_4$-$C_{10}$-dicarboxylic acid or anhydride thereof if it is present in nonpolymeric form are used.

In a particular embodiment of the present invention, (meth)acrylic acid is used as ethylenically unsaturated carboxylic acid and maleic acid or maleic anhydride is used as ethylenically unsaturated $C_4$-$C_{10}$-dicarboxylic acid.

In an embodiment of the present invention, only one ethylenically unsaturated carboxylic acid (b), preferably methacrylic acid and particularly preferably acrylic acid, is used for the preparation of ethylene copolymers.

Suitable esters of ethylenically unsaturated carboxylic acids are phenyl esters and alkyl esters of the abovementioned ethylenically unsaturated carboxylic acids of the general formula I, in particular $C_1$-$C_{10}$-alkyl esters of the abovementioned ethylenically unsaturated carboxylic acids. Preference is given to at least one $C_1$-$C_{10}$-alkyl ester of an ethylenically unsaturated carboxylic acid corresponding to a carboxylic ester of the general formula II,

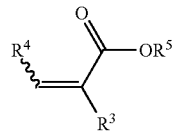

II where the variables are defined as follows:
$R^3$ and $R^4$ are identical or different,
$R^3$ is selected from among hydrogen and
  unbranched and branched $C_1$-$C_{10}$-alkyl such as methyl, ethyl, n-propyl, isopropyl, n-butyl, isobutyl, sec-butyl, tent-butyl, n-pentyl, isopentyl, sec-pentyl, neopentyl, 1,2-dimethylpropyl, isoamyl, n-hexyl, isohexyl, sec-hexyl, n-heptyl, n-octyl, isooctyl, 2-ethylhexyl, n-nonyl, n-decyl, 2-n-propylheptyl; particularly preferably $C_1$-$C_4$-alkyl such as methyl, ethyl, n-propyl, isopropyl, n-butyl, isobutyl, sec-butyl and tert-butyl, in particular methyl or n-butyl;
$R^4$ is selected from among unbranched and branched $C_1$-$C_{10}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, isooctyl, 2-ethylhexyl, n-nonyl, 2-n-propylheptyl, n-decyl; particularly preferably $C_1$-$C_4$-alkyl such as methyl, ethyl, n-propyl, isopropyl, n-butyl, isobutyl, sec-butyl and tent-butyl, in particular methyl;
and very particularly preferably hydrogen;
$R^5$ is selected from among
  unbranched and branched $C_1$-$C_{10}$-alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, isooctyl, 2-ethylhexyl, n-nonyl, 2-n-propylheptyl, n-decyl; particularly preferably 2-ethylhexyl, 2-n-propylheptyl or $C_1$-$C_4$-alkyl such as methyl, ethyl, n-propyl, isopropyl, n-butyl, isobutyl, sec-butyl and tert-butyl, in particular methyl, ethyl, 2-ethylhexyl, 2-n-propylheptyl or n-butyl;
  $C_3$-$C_{12}$-cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl.

In an embodiment of the present invention, $R^3$ is hydrogen or methyl. Very particular preference is given to $R^3$ being hydrogen.

In an embodiment of the present invention, $R^3$ and $R^4$ are each hydrogen.

$R^5$ is very particularly preferably methyl, ethyl, n-butyl, 2-n-propylheptyl or 2-ethylhexyl.

If a plurality of $C_1$-$C_{10}$-alkyl esters of one or more ethylenically unsaturated carboxylic acid(s) are to be used, it is possible to use, for example, two different ethylenically unsaturated carboxylic esters of the general formula II, for example methyl acrylate and methyl methacrylate.

In an embodiment of the present invention, methyl (meth)acrylate, ethyl (meth)acrylate, n-butyl (meth)acrylate, 2-ethylhexyl (meth)acrylate or 2-n-propylheptyl (meth)acrylate is used as $C_1$-$C_{10}$-alkyl ester of an ethylenically unsaturated carboxylic acid.

In an embodiment of the present invention, only one $C_1$-$C_{10}$-alkyl ester of an ethylenically unsaturated carboxylic acid and only one ethylenically unsaturated carboxylic acid, in particular acrylic acid or methacrylic acid and n-butyl (meth)acrylate, are used.

In an embodiment of the present invention, up to 5 parts by weight, based on the sum of the above-described comonomers (a), (b) and (c), of further comonomers (d), for example vinyl acetate and/or isobutene, can be polymerized in for the preparation of ethylene copolymers In an embodiment of the present invention, no further comonomers (d) are polymerized in.

To initiate the free-radical copolymerization, it is possible to use one or more initators (free-radical initiators). Suitable initiators are, for example organic peroxides, oxygen or azo compounds. Mixtures of a plurality of free-radical initiators are also suitable.

Suitable peroxides selected from among commercially available substances are didecanoyl peroxide, 2,5-dimethyl-2,5-di(2-ethylhexancylperoxy)hexane, tert-amyl peroxypivalate, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, 1,4-di(tert-butylperoxycarbonyl)cyclohexane as isomer mixture, tert-butyl perisononanoate, 1,1-di(tert-butylperoxy)-3,3,5-trimethylcyclohexane, 1,1-di(tert-butylperoxy)cyclohexane, methyl isobutyl ketone peroxide, tert-butyl peroxyisopropylcarbonate, 2,2-di(tert-butylperoxy)butane or tert-butyl peroxacetate; tert-butyl peroxybenzoate, di-tentamyl peroxide, dicumyl peroxide, the isomeric di-(tert-butylperoxyisopropyl)benzenes, 2,5-dimethyl-2,5-di-tert-butylperoxyhexane, tert-butyl cumyl peroxide, 2,5-dimethyl-2,5-di(tert-butylperoxy)hex-3-yne, di-tent-butylperoxide, 1,3-diisopropylbenzene monohydroperoxide, cumene hydroperoxide or tert-butyl hydro-peroxide, also dimeric or trimeric ketone peroxides as are known from EP-A 0 813 550.

Particularly suitable peroxides are di-tert-butyl peroxide, tert-amyl peroxypivalate, tert-butyl peroxypivalate, tert-butyl peroxyisononanoate, tert-butyl peroxy-2-ethylhexanoate or 2,2-di(tert-butylperoxy)butane or mixtures thereof. As azo compound, mention may be made by way of example of azobisisobutyronitrile ("AIBN"). Free-radical initiators are introduced in amounts customary for polymerizsations.

Numerous commercially available organic peroxides are admixed with stabilizers before they are sold in order to make them easier to handle. Suitable stabilizers are, for example, white oil or hydrocarbons such as, in particular, isododecane. Under the conditions of the high-pressure polymerization, such stabilizers can have a regulating effect on the molecular weight. For the purposes of the present invention, the use of molecular weight regulators refers to the additional use of further molecular weight regulators in addition to the use of the stabilizers.

In an embodiment of the present invention, ethylene copolymer prepared according to the invention has a melt flow index (MFI) in the range from 0.2 to 50 g/10 min, preferably from 2 to 20 g/10 min, particularly preferably from 5 to 15 g/10 min, measured at 190° C. under a load of 2160 g in accordance with DIN 53735.

In an embodiment of the present invention, ethylene copolymer prepared according to the invention has a molecular weight $M_n$ in the range up to 20 000 g/mol, preferably from 500 to 10 000 g/mol and particularly preferably from 2 000 to 9 500 g/mol.

In an embodiment of the present invention, ethylene copolymer prepared according to the invention has a molecular weight distribution $M_w/M_n$ in the range from 1.7 to 20, preferably from 2 to 10.

In an embodiment of the present invention, ethylene copolymer prepared according to the invention has an acid number in the range up to 200 mg KOH/g, preferably up to 150 mg KOH/g and particularly preferably from 5 to 75 mg KOH/g.

According to the invention, one or more initiators are fed into the reaction mixture downstream of the first reactor.

Here, the expression "downstream of the first reactor" is based on the stream of the reaction mixture flowing through the apparatus.

When the copolymerization is, according to the invention, to be carried out in a cascade comprising two or more high-pressure autoclaves, one or more initiators can, for example, be fed into the first and second high-pressure autoclaves or, if present, into the third high-pressure autoclave.

Preference is given to feeding at least one initiator into a cascade comprising a high-pressure autoclave and a tube reactor, in this case directly into the tube reactor. The initiator can, for example, be fed in at the beginning, in the middle or after one third of the tube reactor. Initiator can also be fed in at a plurality of points on the tube reactor.

In an embodiment of the present invention, the process of the invention is carried out by carrying out the copolymerization in a cascade comprising a high-pressure autoclave followed by a tube reactor and introducing the initiator or initiators into the high-pressure autoclave and between the high-pressure autoclave and the tube reactor or directly into the tube reactor.

The abovementioned compounds are suitable as initiators. Di-tert-butyl peroxide, tert-amyl peroxypivalate, tert-butyl peroxypivalat, tert-butyl peroxyisononanoate, tert-butyl peroxy-2-ethylhexanoate or 2,2-di(tert-butylperoxy)butane or mixtures thereof are particularly suitable.

In an embodiment of the present invention, the initiator or initiators which are, according to the invention, fed in downstream of the first reactor are introduced in the form of a solution in one or more ketone(s) which is/are liquid at room temperature or one or more hydrocarbons.

The initiator or initiators are preferably fed in as a 0.1-50% strength by weight solution, preferably a 1-20% strength by weight solution, in one or more hydrocarbons or one or more ketone(s) which is/are liquid at room temperature or mixtures of hydrocarbons and ketones.

As ketones which are liquid at room temperature, mention may be made of, for example, acetone, methyl isobutyl ketone (MIBK) and in particular ethyl methyl ketone. Hydrocarbons which may be mentioned are aromatic hydrocarbons such as toluene, ethylbenzene, ortho-xylene, meta-xylene and para-xylene, also cycloaliphatic hydrocarbons such as cyclohexane and aliphatic $C_6$-$C_{16}$-hydrocarbons, either branched or unbranched, for example n-heptane, n-octane, isooctane, n-decane, n-dodecane and in particular isododecane (2,2,4,6,6-pentamethylheptane).

In an embodiment of the present invention, from 0.1 to 1000 ppm, preferably from 1 to 200 ppm, of initiator is fed in, based on the output of ethylene copolymer. For the present purposes, ppm are in each case ppm by mass.

In an embodiment of the present invention, initiator is introduced into the reaction mixture downstream of the first reactor in such an amount that from about 51 to 99% of the conversion, based on the total conversion, is achieved in the first reactor and a total of from 1 to 49% of the conversion is achieved in the second reactor and, if present, the further reactors.

In an embodiment of the present invention, the reaction temperature in the reactor into which initiator is fed in according to the invention, is from 5 to 100° C. higher than in the first reactor, preferably from 5 to 50° C. higher and particularly preferably from 10 to 40° C. higher.

The present invention further provides ethylene copolymers which can be obtained by the process of the invention. Ethylene copolymers according to the invention have, when at least one comonomer is selected from ethylenically unsaturated monocarboxylic or dicarboxylic acids or their derivatives, an increased proportion of polar molecules and a particularly nonuniform comonomer distribution. Thus, for example, an ethylene copolymer prepared according to the invention and comprising a total of 40% by weight of comonomers (b) and (c) can consist of a mixture of molecules of which some comprise up to 90% by weight of comonomers (b) and (c) and some comprise less than 1% by weight of comonomers (b) and (c).

Ethylene copolymers according to the invention have a crystallization commencement temperature, $T_{CC}$, in the range from 55 to 75° C., preferably at least 60° C. Here, $T_{CC}$ is determined, for example, by differential thermal analysis (DSC).

Ethylene copolymers according to the invention have a particularly good storability and do not tend to conglutinate or cake. Ethylene copolymers according to the invention are also particularly suitable as impact modifiers. Thermoplastics admixed with ethylene copolymer according to the invention can likewise be stored very well and do not tend to conglutinate or cake even at summer temperatures.

The present invention especially provides ethylene copolymers which have an MFI in the range from 0.2 to 50 g, measured in accordance with DIN 53753, at a temperature of 190° C. under a load of 2.16 kg and comprise, as copolymerized comonomers, (a) from 50 to 80% by weight, preferably up to 75% by weight, of ethylene,
(b1) from 2 to 10% by weight of (meth)acrylic acid,
(b2) from 0.1 to 2% by weight of maleic acid or maleic anhydride,
(c) from 15 to 40% by weight of n-butyl (meth)acrylate,
and have been prepared by the process of the invention. Ethylene copolymers according to the invention have a $T_{CC}$ in the range from 55 to 75° C., preferably from 60 to 70° C.

The invention is illlustrated by examples.

I. Preparation according to the invention of ethylene copolymers

I.1 Preparation according to the invention of ethylene copolymers A.1 to A.3 and comparative copolymers C-A.4 and C-A.5

Ethylene copolymers A.1 to A.3 and comparative copolymers C-A.4 and C-A.5 are in each case copolymers comprising 61.5% by weight of ethylene, 33% by weight of n-butyl acrylate, 5% by weight of acrylic acid and 0.5% by weight of maleic anhydride (in each case copolymerized proportions) which have a melt flow index MFI (190° C., 2.16 kg) of 10 dg/min and have been prepared in a cascade comprising a high-pressure autoclave with downstream tube reactor.

The copolymerization was carried out continuously in a cascade comprising a stirred high-pressure autoclave having a volume of 35 l and a tube reactor having a length of about 200 m and an internal diameter of 15 mm; the ethylene throughput was 1.4 t/h. In the stirred high-pressure autoclave, initiation was carried out using about 2.5 l/h of a peroxide solution (tert-amyl peroxypivalate in isododecane, concentration: 10% by weight). The pressure was 2150 bar, and the maximum temperature in the high-pressure autoclave and in the tube reactor is shown in Table 1. 0.25 l/h of propionaldehyde (PA) was metered in as molecular weight regulator on the suction side of the after-compressor. At the pressure regulating valve, the reaction mixture was depressurized to about 400 bar, which resulted in an increase in the temperature. The tube reactor was cooled by means of pressurized water having a temperature of 200° C. At the transition between the autoclave and the tube reactor, initiator (tert-amyl peroxypivalate, tert-butyl peroxy-2-ethylhexanoate, 1:2 mixture based on parts by weight, in isododecane, total concentration of peroxides: 8% by weight) was fed in the amount shown in Table 1 in Examples A1 to A3. In comparative examples C-A.4 and C-A.5, no initiator was introduced into the tube reactor.

TABLE 1

Experimental data for the ethylene copoolymers A.1 to A.3 prepared according to the invention and for the comparative copolymers C-A.4 and C-A.5

| ECP | Output [t/h] | $T^{max}$, high-pressure autoclave | $T^{max}$, tube reactor | PO fed into the tube reactor [kg/h] |
|---|---|---|---|---|
| A.1 | 0.21 | 199 | 222 | 0.68 |
| A.2 | 0.21 | 193 | 229 | 1.55 |
| A.3 | 0.23 | 190 | 229 | 1.44 |
| C-A.4 | 0.18 | 198 | 212 | 0 |
| C-A.5 | 0.19 | 196 | 215 | 0 |

ECP: Ethylene copolymer
PO fed in: amount of tert-amyl peroxypivalate, tert-butyl peroxy-2-ethylhexanoate mixture (1:2 based on parts by weight, in isododecane, total concentration of peroxides: 8% by weight) fed into the tube reactor II. Testing of the Caking Tendency To test for caking, 800 ml (=about 430 g) of ethylene copolymer were introduced into a measuring cylinder and loaded with a metal weight (2.6 kg). The loaded cylinder was subsequently incubated at 40° C. for 7 days. After cooling to room temperature, the measuring cylinder was rotated through 180° C. and the powder flow was assessed.

Evaluation Scale:
++=very little caking; powder flow commences after a few seconds, no or only very small agglomerates
+=slight caking; powder flow commences after a knock on the bottom of the measuring cylinder, medium agglomerates
o=caking; powder flow commences after knocking on the bottom and side of the measuring cylinder, medium and large agglomerates

TABLE 2

Use properties of the ethylene copolymers A.1 to A.3 prepared according to the invention and of the comparative copolymers C-A.4 and C-A.5

| | $T_g$ [° C.] | $T_m$ [° C.] | $T_{CC}$ [° C.] | Caking tendency |
|---|---|---|---|---|
| A.1 | −40 | 27.3 and 69.0 | 63 | + |
| A.2 | −42 | 28.4 and 72.3 | 65 | ++ |
| A.3 | −42 | 25.7 and 74.5 | 65 | + |
| C-A.4 | −40 | 18.4 | 50 | 0 |
| C-A.5 | −42 | 18.3 and 61.7 | 53 | 0 |

$T_g$ = glass transition temperature, measured in accordance with DIN 53765
$T_m$: softening temperature, measured in accordance with DIN 53765 in the second cycle
$T_{CC}$: Crystallization commencement temperature, measured in accordance with DIN 53765

The invention claimed is:
1. An ethylene copolymer prepared by reacting ethylene and at least one comonomer via free-radical copolymerization in a cascade comprising a first reactor and at least one additional reactor, wherein said reactors include a high-pressure autoclave and a tube reactor and wherein at least one initiator is fed into the reaction mixture downstream from said first reactor;

wherein said ethylene copolymer has an MFI in the range of from 0.2 to 50 g/10 min, measured in accordance with DIN 53753, at a temperature of 190° C. under a load of 2.16 kg; and wherein said ethylene copolymer was copolymerized from
(a) 50 to 75% by weight of ethylene;
(b1) 2 to 10% by weight of (meth)acrylic acid;
(b2) 0.1 to 2% by weight of maleic acid or maleic anhydride; and
(c) 15 to 40% by weight of n-butyl (meth)acrylate.

2. The ethylene copolymer of claim 1, wherein said at least one initiator is fed into the reaction mixture in the form of a 0.5 to 50% by weight solution, the solvent of which is at least one hydrocarbon or at least one ketone which is liquid at room temperature.

3. The ethylene copolymer of claim 1, wherein said at least one initiator is an organic peroxide.

4. The ethylene copolymer of claim 1, wherein said cascade is selected from the group consisting of cascades comprising at least two high-pressure autoclaves, cascades comprising at least two tube reactors, and cascades comprising a high-pressure autoclave and a tube reactor.

5. The ethylene copolymer of claim 1, wherein said at least one comonomer is selected from the group consisting of ethylenically unsaturated carboxylic acids, ethylenically unsaturated dicarboxylic acids and their anhydrides, esters of ethylenically unsaturated carboxylic acids, and vinyl carboxylates.

6. The ethylene copolymer of claim 1, wherein said free-radical copolymerization reaction is carried out at a temperature in the range of from 120° C. to 350° C.

7. The ethylene copolymer of claim 1, wherein said free-radical copolymerization reaction is carried out at a pressure in the range of from 500 to 5000 bar.

8. The ethylene copolymer of claim 1, wherein said ethylene copolymer has a molecular weight $M_n$ of up to 20,000 g/mol.

9. The ethylene copolymer of claim 1, wherein said free-radical copolymerization reaction is carried out in a cascade comprising a high-pressure autoclave followed by a tube reactor and said at least one initiator is introduced into said high-pressure autoclave and between said high-pressure autoclave and said tube reactor or directly into said tube reactor.

10. A bonding agent, impact modifier, or additive in wood-plastic composites or in the coating of surfaces comprising the ethylene copolymer of claim 1.

* * * * *